United States Patent [19]

Ressia

[11] Patent Number: 4,992,911

[45] Date of Patent: Feb. 12, 1991

[54] MOTOR VEHICLE HEADLIGHT

[75] Inventor: Alessio Ressia, Cirie, Italy

[73] Assignee: Carello S.P.A., Turin, Italy

[21] Appl. No.: 439,495

[22] Filed: Nov. 21, 1989

[30] Foreign Application Priority Data

Nov. 22, 1988 [IT] Italy .......................... 53550 B/88[U]

[51] Int. Cl.[5] .............................................. B60Q 1/00

[52] U.S. Cl. ...................................... 362/61; 362/297; 362/346

[58] Field of Search .................. 362/61, 341, 346, 80, 362/296, 297, 298, 347

[56] References Cited

U.S. PATENT DOCUMENTS 4,268,895 5/1981 Vabata ................................ 362/341

4,276,583 6/1981 Fratty .................................. 362/346

4,344,120 8/1982 Bradley et al. ....................... 362/61

4,566,086 1/1986 Kouchi et al. ...................... 362/346

FOREIGN PATENT DOCUMENTS 2000266 1/1979 United Kingdom ............... 362/346

*Primary Examiner*—Allen M. Ostrager
*Assistant Examiner*—Sue Hagarman
*Attorney, Agent, or Firm*—Klauber & Jackson

[57] ABSTRACT

A substantially rectangular motor vehicle headlight, the reflecting body of which is defined by a rear paraboloid of rotation defined by lateral end walls, the curved inner surfaces of which are in the form of two lateral paraboloids of translation arranged with their concave sides facing each other and having respective focal axes coinciding with each other and with the optical axis of the rear paraboloid; a light source being provided on the optical axis and at the focus point of the rear paraboloid.

4 Claims, 2 Drawing Sheets

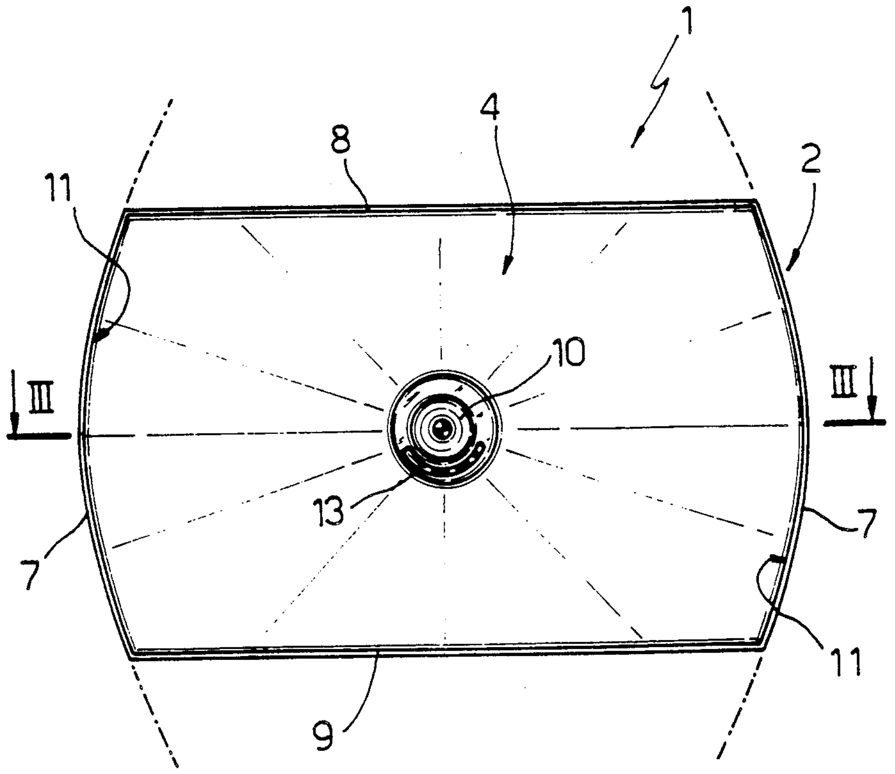
Fig. 2
Fig. 3
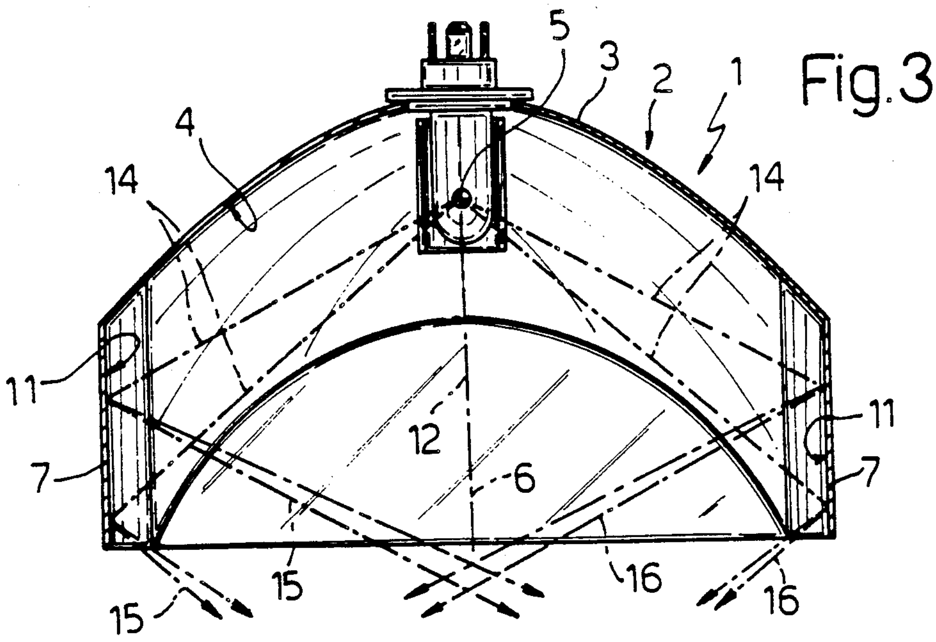

MOTOR VEHICLE HEADLIGHT

BACKGROUND OF THE INVENTION

The present invention relates to a motor vehicle headlight.

In particular, the present invention relates to a substantially rectangular traffic beam headlight of the type comprising a rear paraboloid of rotation, defined by two opposed lateral walls, and a lamp located at the focus point of the rear paraboloid.

On known headlights of the aforementioned type, said two lateral walls are usually two flat vertical walls, by which the incident light rays would be reflected in uncontrolled manner, thus resulting in glare, if they were not intercepted by metal screens close to the lamp. In other words, on known headlights of the aforementioned type, glare is eliminated at the expense of the efficiency of the headlight itself.

SUMMARY OF THE INVENTION

The aim of the present invention is to provide a substantially rectangular headlight capable of employing the light source to full capacity, while at the same time eliminating glare.

With this aim in view, according to the present invention, there is provided a motor vehicle headlight comprising a reflecting body, in turn comprising a rear wall designed in such a manner as to define a rear paraboloid of rotation and two lateral end walls; and a light source located at the focus point of said rear paraboloid; characterised by the fact that said two lateral end walls are designed in such a manner as to define respective lateral paraboloids of translation arranged with their concave sides facing each other, and having substantially horizontal focal axes parallel to the optical axis of said rear paraboloid.

BRIEF DESCRIPTION OF THE DRAWINGS

The present invention will be described by way of example, with reference to the accompanying drawings, in which:

FIG. 2 shows a front view of the FIG. 1 headlight;

FIG. 3 shows a section along line III—III in FIG. 2.

DETAILED DESCRIPTION OF THE INVENTION

Figure 1:
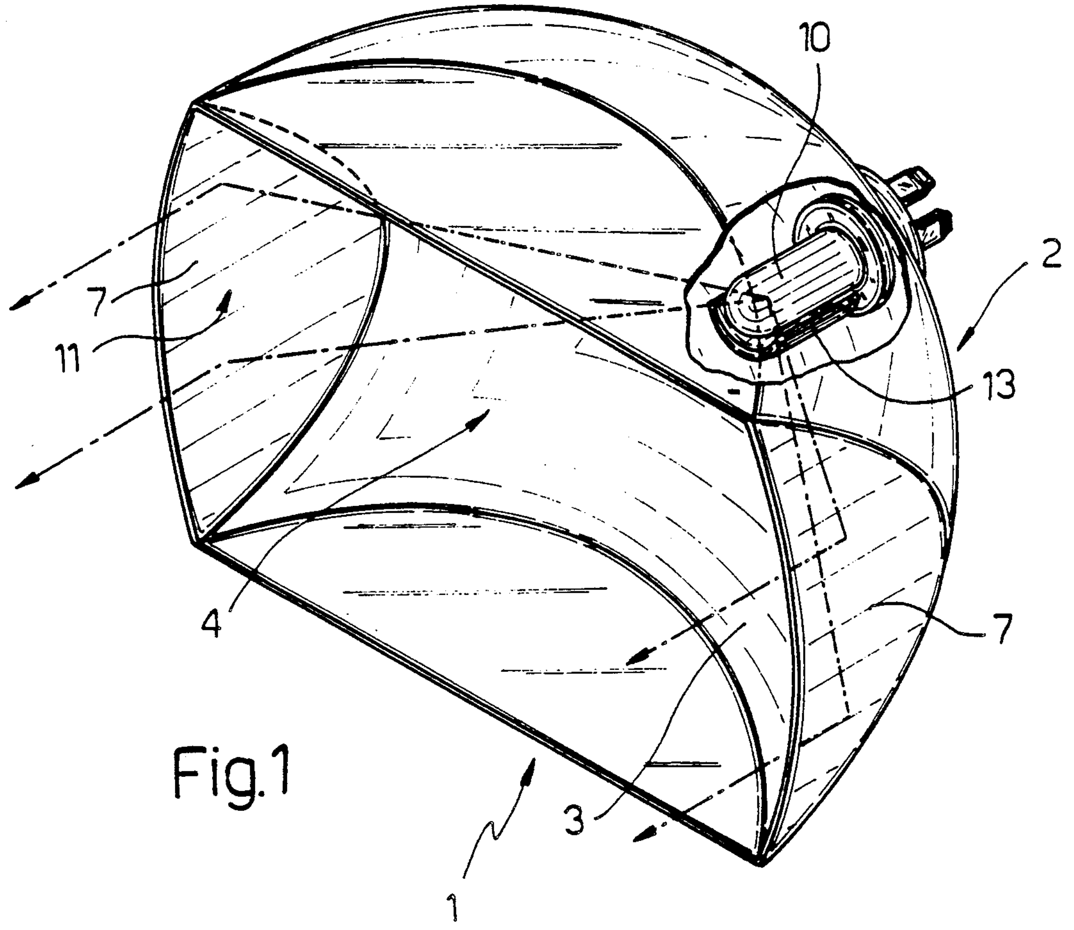
FIG. 1 shows a schematic view in perspective, with parts removed for simplicity, of a preferred embodiment of the headlight according to the present invention.

Number 1 in FIGS. 1, 2 and 3 indicates a motor vehicle headlight comprising a reflecting body 2, in turn comprising a rear wall 3, the inner reflecting surface 4 of which is in the form of a rear paraboloid of rotation having a focus point 5 and a substantially horizontal optical axis 6. Reflecting body 2 also comprises two substantially vertical lateral end walls 7, and a flat top and bottom wall 8 and 9 parallel to each other and to said optical axis 6.

Headlight 1 also comprises a lamp 10 with its filament located at focus point 5.

As shown more clearly in FIG. 2, lateral walls 7 present respective inner reflecting surfaces 11 in the form of respective lateral paraboloids of translation arranged with their concave sides facing each other and having focal axes 12 coinciding with each other and with optical axis 6 of said rear paraboloid.

As shown in FIG. 3, in actual use, lamp 10 emits a first set of direct rays (not shown), which are intercepted by a darkened, internally-reflecting front end of lamp 10 (not shown), and reflected back on to surface 4 by which they are reflected outwards in such a manner as to form a beam (not shown) parallel to optical axis 6.

Lamp 10 also emits a second set of rays (not shown) directly on to surface 4, by which they are reflected outwards, parallel to optical axis 6.

Lamp 10 also emits a further four sets of direct rays, of which the first two (not shown) strike the inner surfaces of walls 8 and 9, by which they are directed downwards and upwards respectively.

To prevent the emission of an upward-reflected, i.e. dazzling, beam by headlight 1, the inner surface of wall 9 is either blacked or ruled. Alternatively, as shown in FIG. 1, a reflecting dish 13 is provided between lamp 10 and wall 9. According to a further variation (not shown), the lower part of lamp 10 is darkened and rendered internally reflecting, so as to direct the incident rays on to wall 8.

The third and fourth beams (numbered 14 in FIG. 3) strike the parabolic reflecting surfaces 11 of walls 7, by which they are reflected outwards so as to form two converging, substantially horizontal traffic beams 15 and 16.

I claim:

1. A motor vehicle headlight comprising a reflecting body which includes a rear wall that defines a rear paraboloid of rotation having a focus point and an optical axis, and two lateral end walls; and a light source located at the focus point of said rear paraboloid; characterised by the fact that said two lateral end walls define respective lateral paraboloids of translation arranged with concave sides thereof facing each other, and having substantially horizontal focal axes parallel to the optical axis of said rear paraboloid.

2. A headlight as claimed in claim 1, characterised by the fact that said two focal axes are coincident with each other.

3. A headlight as claimed in claim 1, characterised by the fact that said two focal axes are coincident with each other and with the optical axis of said rear paraboloid.

4. A headlight as claimed in claim 1, characterised by the fact that said reflecting body also comprises flat, substantially horizontal top and bottom walls parallel to each other; and reflecting and intercepting means being provided for intercepting rays of light striking said bottom wall and reflecting the same on to said top wall.

* * * * *